United States Patent

Paradis et al.

Patent Number: 4,610,276
Date of Patent: Sep. 9, 1986

[54] DIRECTIONAL FLOW CONTROL

[75] Inventors: Joseph R. Paradis; Edward W. Kaleskas, both of Holden, Mass.

[73] Assignee: Nypro Inc., Clinton, Mass.

[21] Appl. No.: 427,484

[22] Filed: Sep. 29, 1982

[51] Int. Cl.⁴ ............................................. F16K 15/16
[52] U.S. Cl. .................................. 137/856; 137/872; 604/86
[58] Field of Search ................................ 137/855–858, 137/515.5, 872, 851, 852; 251/367; 604/82–86

[56] References Cited

U.S. PATENT DOCUMENTS

| | | | |
|---|---|---|---|
| 2,270,468 | 1/1942 | Osborn, Jr. | 137/851 |
| 3,370,305 | 2/1968 | Goott et al. | 137/855 |
| 3,457,933 | 7/1969 | Craft | 137/872 |
| 3,891,000 | 6/1975 | Melnick | 137/855 |
| 4,000,740 | 1/1977 | Mittleman | 604/86 |
| 4,005,710 | 2/1977 | Zeddies et al. | 604/86 |
| 4,222,407 | 9/1980 | Ruschke et al. | 137/855 |
| 4,405,316 | 9/1983 | Mittleman | 604/86 |

*Primary Examiner*—Martin P. Schwadron
*Assistant Examiner*—Sheri M. Novack
*Attorney, Agent, or Firm*—George E. Kersey

[57] ABSTRACT

A flow device including a plurality of flow channels which converge in a common housing containing a pre-biased flow control diaphragm at the position of convergence of at least two channels. The control diaphragm is pre-biased by a set of prongs which extend from an integral portion of the common housing.

8 Claims, 6 Drawing Figures

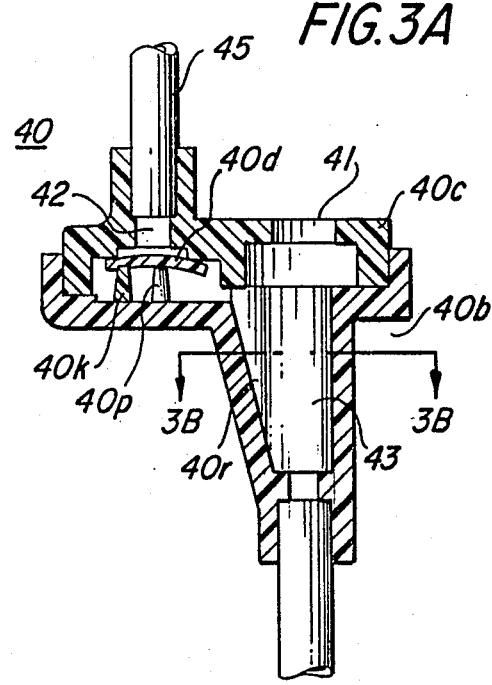
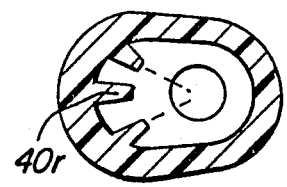
FIG. 3A
FIG. 3B
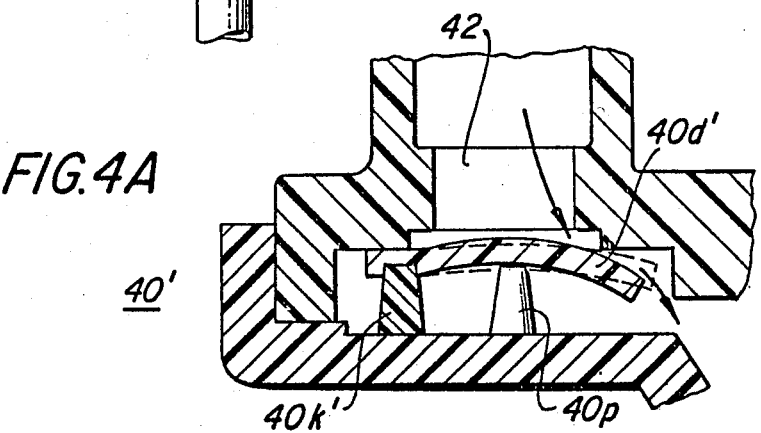
FIG. 4A
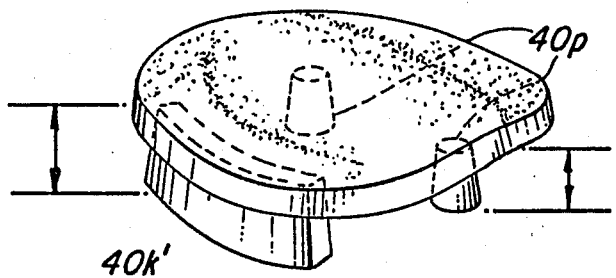
FIG. 4B

DIRECTIONAL FLOW CONTROL

BACKGROUND OF THE INVENTION

This invention relates to flow control, and, more particularly, to the directional control of fluid flow.

In many situations it is necessary to control the flow of fluids, such as liquids and gases. A common device for that purpose is known as a check valve. It functions by the deflection of an elastomeric element towards a valve seat in order to prevent flow and away from the seat to permit flow.

In some cases it is necessary to control fluid flow along a multiplicity of channels that have varying degrees of convergence with one another. A typical multichannel arrangement makes use of connectors which permit the intercoupling of flow channels as desired. For example, when two channels are to be joined selectively to permit a common output along a single channel, the connector typically takes the form of a fitting in the form of a "Y".

The inclusion of control valves in the various lines leading to a coupler fitting can pose a number of complications. The inclusion of separate control elements can cause difficulties in assuring proper sealing. A common point of leakage in a line often occurs where the line has been severed in order to receive a control element. In addition, the inclusion of separate control elements in various lines leading to a coupler does not always provide the most efficient control over fluid flow.

Accordingly, it is an object of the invention to promote control over fluid flow, particularly in arrangements where a multiplicity of flow control lines are involved. A related object is to promote control over fluid flow where converging flow control lines are used. Another related object is to promote control over fluid flow in situations where so called "Y" couplers are employed.

SUMMARY OF THE INVENTION

In accomplishing the foregoing and related objects, the invention provides for the incorporation within units for the coupling of a plurality of flow channels of a directional flow instrumentality. The inclusion of the flow control instrumentality within the coupling avoids the need for external valving and the attendant requirement of splicing flow control lines or supplementing flow control lines with external valving. This not only provides a more efficient arrangement for the flow control apparatus, it also reduces the possibilities of malfunctioning and leakage that can arise when external valving is employed in flow control systems.

In accordance with one aspect of the invention, a plurality of flow channels converge in a common housing which contains a prebiased flow control diaphragm at the position of convergence of at least two of the channels.

In accordance with another aspect of the invention, the control diaphragm is prebiased by a set of prongs which extend from an intregral portion of the common housing.

In accordance with a further aspect of the invention, access between channels at the position in the common housing containing the prebiased diaphragm is through a set of ribs which provide internal support for at least one structural member of the common housing.

In accordance with still another aspect of the invention, one of the channels is sealed at the common housing by a member which includes a circular sealing ring that surrounds the associated channel.

In accordance with yet another aspect of the invention, the prebiasing of the diaphragm is greater away from the region of outward flow than at the flow convergence position in the housing. The increase in prebiasing is desirably provided by an elongated sector which securely positions the diaphragm along a portion of its seat. This not only provides the desired directionality but also promotes proper function of the valve by preventing an inadvertent displacement of the diaphragm that could otherwise cause a malfunction.

In addition, the prebiasing prongs that provide less biasing than the sector element are desirably at the inner peripheral extension of the sector to promote proper seating of the diaphragm.

DESCRIPTION OF THE DRAWINGS

Other aspect of the invention will become apparent after considering several illustrative embodiments taken in conjunction with the drawings in which:

FIG. 3A is a cross-sectional view of the directional flow control and coupling device of FIG. 2;

FIG. 3B is a sectional view of the device of FIG. 3A;

FIG. 4A is an alternative control arrangement for the device of FIG. 2; and

FIG. 4B is perspective view illustrating the prebiasing elements used in the arrangement of FIG. 4A.

DETAILED DESCRIPTION

Figure 1:
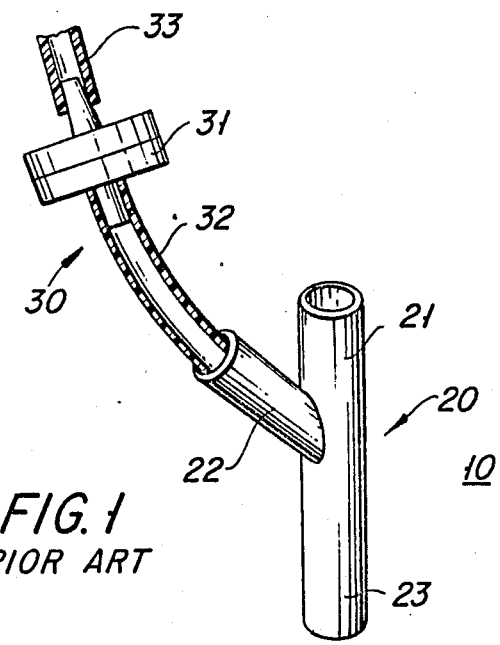
FIG. 1 is a perspective view illustrating the prior art use of control valves in connection with a coupling for combining different flow channels.

With reference to the drawings, a coupling arrangement 10 in accordance with the prior art is shown in FIG. 1. For illustration a "Y" coupler 20 with branch arms 21 and 22 is shown with tubing 30 extending to the branch arm 22. In this arrangement the arm 21 provides a connection for a first flow channel and the branch arm 22 provides a connection for a branch flow channel. The channels converge to a single output channel for which connection is provided by the stem 23 of the coupler 20.

Illustratively control over the channel including the tubing 30 is exercised by a check valve 31. The latter is illustratively of the kind disclosed in U.S. Pat. No. 4,286,628 issued Sept. 1, 1981. It is inserted into the tubing arrangement 30 at the position where the section 32 of the tubing 30 is separated from the section 33. This requires severance of the tubing and can create a position of leakage or other difficulties, in addition to the inconvenience associated with the mechanics of making the insertion.

In addition, the valve 31 of FIG. 1 exercises control over the channel flow in which it is positioned without regard to the other channels, for example, the channel 21 of the coupler 20. In order to coordinate the flows of the channels 21 and 22 in the coupler 20, as well as eliminate the need for the external valve 31 in the tubing 30, the invention provides the integrated coupler and controller 40 shown in FIG. 2. The integrated coupler and controller 40 not only eliminates the need for an external control valve and the attendant undesirability of having to sever the input tubing 45 it also provides greater precision in the control of flow among the channels 41, 42, and 43. In particular it provides greater directionality for the flow from channel 42 to 43.

Figure 2:
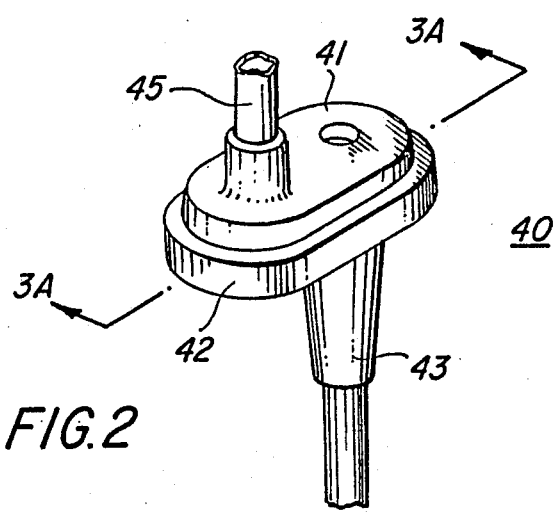
FIG. 2 is a perspective view of a directional flow control valve in accordance with the invention.

A cross-sectional view of a first embodiment of the internal components of the integrated controller and coupler 40 of FIG. 2 is shown in FIG. 3A. The device 40 is formed by a base 40b and a cap 40c. The cap 40c contains apertures for the first flow channel 41 and the branch flow channel 42. Flow from the respective channels 41 and 42 is selectively combined in the output channel 43 in accordance with the operation of a control diaphragm 40d which seals the channel 42 according to whether there is upward flow in the channel 43 or downward flow in the tubing 45. In the case of downward flow the diaphragm 40d is moved away from its seat 40s in the cap 40c, as pictured in FIG. 3A. Conversely, when downward flow in the tubing 45 is terminated, or when there is upward flow in the output channel 43, the diaphragm 40d again becomes seated and there is no outflow along the tubing 45. This kind of diaphragm operation is commonly provided by a check valve but in the present case is provided by a multifunction coupling structure 40. In order to properly seat the diaphragm 40d when there is no downward flow along the tubing 45, the base member 40b includes biasing prongs 40p on a platform 40f of the base 40b. Prebiasing means that there is a small force, i.e. bias, exerted against the diaphragm 40d by the prongs 40p when the diaphragm is in its equilibrium position. When flow does take place through the channel 42, it is directed into the output channel 43 by ribs 40r which extend upwardly from the base 40b and into contact with the cap 40c when it is positioned on the device 40 as shown in FIG. 3A. The structure of the ribs 40r is further illustrated in the sectional view of FIG. 3B. The ribs 40r are configured like fins which if extended would converge at the center line of the outlet channel 43. In addition the ribs 40r are trapezoidal in cross section with the maximum base width at the wall of the base 40r. This configuration promotes the desired flow and its control.

A further embodiment of that portion of the coupler which provides directional flow control is illustrated for an alternative coupler 40' shown partially in FIG. 4A. The diaphragm 40d' is securely seated at the mouth of the channel 42 by a clamping member 40k' on the platform 40f'. The configuration of an illustrative clamp 40k' is shown as a sector in FIG. 4B. Prebiasing of the diaphragm 40d' is accomplished by centrally positioned prongs 40p', of which only one is visible in FIG. 4A. An illustrative disposition of the prongs 40p' is shown in FIG. 4B with the prongs 40p' straddling the center position of the diaphragm 40d'.

The use of the clamp 40k' and the prebiasing prongs 40p' provides the desired directionality of flow through the channel 42 as illustrated by the flow arrow F. Because of the clamping effect the diaphragm 40d' remains seated in the presence of flow at that portion of the seat opposite the clamp 40k. The other side of the diaphragm is free to move to its open position as illustrated for the diaphragm 40d' in FIG. 4A. For comparison the diaphragm is shown in its equilibrium position in phantom.

The combination of the particular prebiasing for the diaphragm provided by the invention together with the directional effect of the ribs at the outlet of the branch channel provide the desired directional control over fluid flow in the coupler. In addition, the clamping effect assures proper seating of the diaphragm and prevents inadvertent shift of the diaphragm which could interfere with operation.

While various aspects of the invention have been set forth by the drawings and specification, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. A flow control device which comprises
a main channel for the throughflow of fluid;
a branch channel connected to said main channel at an intermediate position thereof for the convergence of flow through said main channel with flow through said branch channel; and
means at the convergence of the two channels for controlling the flow therebetween comprising a diaphragm which is bowed under pressure into the inlet of said branch channel;
whereby the application of pressure to said diaphragm assures the sealing of said branch channel against flow diverted from said main channel;
said apparatus having a common housing for said main flow channel and said branch flow channel, wherein said diaphragm is bowed into said branch channel by a set of prongs having tips that extend as projections from a shelf that is common to the branch and main channels and is transverse to the axis of said branch channel;
wherein the bowing of said diaphragm is asymmetric and greater pressure applied thereby away from the region of outflow from said branch channel.

2. Apparatus as defined in claim 1 wherein said diaphragm is bowed under pressure by a set of prongs which extend in the axial direction of said branch channel.

3. Apparatus as defined in claim 2 wherein said diaphragm is affixed along a portion of one edge at the mouth of said branch channel and a plurality of prongs extend axially within the circumference of the mouth of said branch channel in the direction of said branch channel against said diaphragm; whereby an edge of said diaphragm opposite the edge affixed at the mouth of said branch channel is free to yield directionally to fluid flowing in said branch channel and converge with fluid in said main channel.

4. Apparatus as defined in claim 1 having a common closure cap for said main channel and said branch flow channel inserted into said common housing, wherein access from said branch channel to said main channel is trough a set of ribs which provide intermediate support for said common closure cap of said apparatus.

5. Apparatus as defined in claim 4 wherein said closure cap includes a sealing member for said main channel.

6. Apparatus as defined in claim 1 wherein said sealing member is further sealed in said cap by a circular sealing ring which surrounds said main channel.

7. Apparatus as defined in claim 1 wherein said increased bowing is provided by at least one member which is longer than the remaining members.

8. Apparatus as defined in claim 1 wherein the prebiasing of said diaphragm is by a set of prongs on a platform portion of said common housing and ssid ribs are positioned in said housing at one end of said platform.

* * * * *